United States Patent
Bigelow et al.

(10) Patent No.: US 10,683,661 B2
(45) Date of Patent: Jun. 16, 2020

(54) BUILDING MODULE WITH POURABLE FOAM AND CABLE

(71) Applicants: William H. Bigelow, Houston, TX (US); Andrew J. Huber, Houston, TX (US)

(72) Inventors: William H. Bigelow, Houston, TX (US); Andrew J. Huber, Houston, TX (US)

(*) Notice: Subject to any disclaimer, the term of this patent is extended or adjusted under 35 U.S.C. 154(b) by 23 days.

(21) Appl. No.: 16/244,691

(22) Filed: Jan. 10, 2019

(65) Prior Publication Data

US 2019/0234065 A1 Aug. 1, 2019

Related U.S. Application Data

(63) Continuation-in-part of application No. 15/912,747, filed on Mar. 6, 2018, now abandoned, and a
(Continued)

(51) Int. Cl.
| | |
|---|---|
| E04C 2/26 | (2006.01) |
| E04C 2/00 | (2006.01) |
| E04B 1/74 | (2006.01) |
| E04G 21/14 | (2006.01) |
| E04B 2/56 | (2006.01) |
| E04B 7/22 | (2006.01) |
| E04F 21/18 | (2006.01) |
| E04B 9/00 | (2006.01) |

(Continued)

(52) U.S. Cl.
CPC .............. *E04B 1/74* (2013.01); *B29C 44/186* (2013.01); *E04B 1/7604* (2013.01); *E04B 2/562* (2013.01); *E04B 2/707* (2013.01); *E04B 7/22* (2013.01); *E04B 9/001* (2013.01); *E04C 2/386* (2013.01); *E04F 21/085* (2013.01); *E04F 21/1805* (2013.01); *E04G 21/142* (2013.01); *E04B 1/0023* (2013.01); *E04B 2001/742* (2013.01); *E04B 2001/743* (2013.01)

(58) Field of Classification Search
CPC . E04B 1/78; E04B 1/94; E04B 1/7654; E04B 5/02
USPC ........................................................ 52/309.13
See application file for complete search history.

(56) References Cited

U.S. PATENT DOCUMENTS

| | | |
|---|---|---|
| 2,191,804 A | 8/1938 | O'Malley |
| 3,641,724 A | 2/1972 | Palmer |
| (Continued) | | |

FOREIGN PATENT DOCUMENTS

WO 9738178 10/1997

*Primary Examiner* — Joshua J Michener
*Assistant Examiner* — James J Buckle, Jr.
(74) *Attorney, Agent, or Firm* — Ira Domnitz

(57) ABSTRACT

A building component utilizing a pourable polyurethane or structural foam that can be used for floors, walls, and roof assemblies with a frame with an interior, back or a front, multiple partition beams forming cells in said frame, pourable polyurethane or structural foam exterior backing attached to said frame back. The structural foam is poured into said cells to a desired level, and after said structural foam is poured into said cells, said interior backing is attached to said frame front. Cabling is used to improve movability of the invention, and improve on wind loading and seismic requirements of the present invention. Safety is also improved during the manufacturing process, loading, unloading, and in final assembly through the use of cabling.

14 Claims, 8 Drawing Sheets

Related U.S. Application Data continuation-in-part of application No. 15/883,681, filed on Jan. 30, 2018, now abandoned, and a continuation-in-part of application No. 15/883,617, filed on Jan. 30, 2018, now abandoned.

(51) Int. Cl.
| | | |
|---|---|---|
| *E04C 2/38* | (2006.01) | |
| *B29C 44/18* | (2006.01) | |
| *E04B 2/70* | (2006.01) | |
| *E04B 1/76* | (2006.01) | |
| *E04F 21/08* | (2006.01) | |
| *E04B 1/00* | (2006.01) | |

(56) References Cited

U.S. PATENT DOCUMENTS

| | | | |
|---|---|---|---|
| 3,765,543 A * | 10/1973 | Thomas | E04G 21/16 |
| | | | 414/11 |
| 3,800,493 A * | 4/1974 | Livingston | E04B 1/34869 |
| | | | 52/745.03 |
| 3,834,110 A * | 9/1974 | Vercelletto | B28B 15/00 |
| | | | 52/745.02 |
| 3,963,395 A | 6/1976 | Bourdo | |
| 4,260,569 A | 4/1981 | Hurst | |
| 4,327,529 A | 5/1982 | Bigelow | |
| 4,470,227 A | 9/1984 | Bigelow | |
| 4,574,533 A | 3/1986 | Bigelow | |
| 4,637,179 A | 1/1987 | Bigelow | |
| 4,671,724 A * | 6/1987 | Bolton | B65G 59/063 |
| | | | 221/283 |
| 4,712,347 A | 12/1987 | Sperber | |
| 4,733,896 A * | 3/1988 | Klein | F22B 37/00 |
| | | | 294/67.1 |
| 4,856,244 A | 8/1989 | Clapp | |
| 5,033,248 A | 7/1991 | Phillips | |
| 5,218,803 A | 6/1993 | Wright | |
| 5,353,560 A | 10/1994 | Heydon | |
| 5,353,563 A | 10/1994 | White | |
| 5,371,990 A | 12/1994 | SalahUddin | |
| 5,402,618 A * | 4/1995 | Biffis | B28B 7/22 |
| | | | 296/35.3 |
| 5,491,934 A | 2/1996 | Bigelow | |
| 5,507,427 A | 4/1996 | Burgett | |
| 5,641,368 A | 6/1997 | Romes | |
| 5,649,401 A | 7/1997 | Harrington, Jr. | |
| 5,657,606 A | 8/1997 | Ressel | |
| 5,666,780 A | 9/1997 | Romes | |
| 5,724,783 A | 3/1998 | Mandish | |
| 5,758,463 A | 6/1998 | Mancini, Jr. | |
| 5,765,330 A | 6/1998 | Richard | |
| 5,864,992 A | 2/1999 | Bigelow | |
| 5,921,046 A | 7/1999 | Hammond, Jr. | |
| 6,085,470 A | 7/2000 | Bigelow | |
| 6,088,969 A | 7/2000 | Bigelow | |
| 6,240,684 B1 | 6/2001 | Bigelow | |
| 6,260,329 B1 * | 7/2001 | Mills | E04C 2/049 |
| | | | 52/309.4 |
| 6,295,766 B1 | 10/2001 | Bigelow | |
| 6,332,298 B1 | 12/2001 | Bigelow | |
| 6,332,304 B1 | 12/2001 | Fuhrman | |
| 6,341,468 B1 | 1/2002 | Bigelow | |
| 6,630,249 B2 | 10/2003 | Kennedy | |
| 6,703,331 B1 | 3/2004 | Bruce | |
| 6,729,090 B2 | 5/2004 | Messenger | |
| 6,729,094 B1 | 5/2004 | Spencer | |
| 6,862,847 B2 | 3/2005 | Bigelow | |
| 6,869,261 B2 * | 3/2005 | Burke | E04G 21/168 |
| | | | 414/11 |
| 6,892,504 B1 | 5/2005 | diGirolamo | |
| 7,127,856 B2 | 10/2006 | Hagen, Jr. | |
| 7,168,216 B2 | 1/2007 | Hagen, Jr. | |
| 7,299,856 B2 | 11/2007 | Blejde | |
| 7,870,698 B2 | 1/2011 | Tonyan | |
| 8,002,240 B1 * | 8/2011 | Wilson, Sr. | B66C 1/16 |
| | | | 254/1 |
| 8,397,454 B2 | 3/2013 | Commins | |
| 8,613,172 B2 | 12/2013 | Olson | |
| 8,696,966 B2 | 4/2014 | Smith | |
| 8,789,338 B2 | 7/2014 | Kulprathipanja | |
| 8,877,329 B2 | 11/2014 | Ciuperca | |
| 8,978,343 B1 * | 3/2015 | Sandor | E04G 21/142 |
| | | | 414/10 |
| 9,562,359 B1 | 2/2017 | Grisolia | |
| 9,702,152 B2 | 7/2017 | Sievers | |
| 2002/0014051 A1 | 2/2002 | Fraval | |
| 2004/0111997 A1 | 6/2004 | Gigiakos | |
| 2005/0000178 A1 | 1/2005 | Rodgers | |
| 2005/0257456 A1 * | 11/2005 | Biffis | E04B 1/10 |
| | | | 52/220.1 |
| 2006/0174572 A1 * | 8/2006 | Tonyan | B32B 3/06 |
| | | | 52/481.2 |
| 2007/0094992 A1 | 5/2007 | Antonic | |
| 2007/0245660 A1 | 10/2007 | Scott | |
| 2008/0134589 A1 | 6/2008 | Abrams | |
| 2008/0295425 A1 | 12/2008 | Farag | |
| 2009/0293280 A1 | 12/2009 | Gharibeh | |
| 2013/0074432 A1 | 3/2013 | Ciuperca | |
| 2013/0305643 A1 | 11/2013 | Singleton | |
| 2014/0059961 A1 | 3/2014 | Yin | |
| 2014/0115988 A1 | 5/2014 | Sievers | |

* cited by examiner

BUILDING MODULE WITH POURABLE FOAM AND CABLE

CROSS-REFERENCE TO RELATED APPLICATIONS

This patent application is a Continuation-in-Part claims priority to U.S. patent application Ser. Nos. 15/883,617 and 15/883,681, both filed on Jan. 30, 2018, and incorporates all content of said applications as if set forth in full herein, as well as to U.S. patent application Ser. No. 15/912,747 filed on Mar. 6, 2018 and incorporates all content of said application as if set forth in full herein.

STATEMENT REGARDING FEDERALLY SPONSORED RESEARCH

Not applicable.

BACKGROUND

The present invention generally relates to the use of polyurethane foams in a pourable application for use in making prefabricated building materials in order to provide increased strength, durability and safety while at the same time improving production time as well as minimizing waste. The present invention generally relates to a building component utilizing a pourable polyurethane foam that can be used as a structural polyurethane foam for floors, walls, and roof assemblies with a frame with an interior, back and a front, multiple partition beams forming cells in said frame, pourable polyurethane foam exterior backing attached to said frame back. The polyurethane is poured into said cells to a desired level, and after said polyurethane is poured into said cells, said interior backing is attached to said frame front. The present invention also generally relates to the use of cabling to improve movability of the invention, wind loading and seismic requirements. The present invention also generally relates to the use of cabling to tie down wall elements and pieces.

The present invention is distinguished from the following art in many ways:

U.S. Pat. No. 4,327,529 to Bigelow discloses a prefabricated building. The present invention involves the use of a pourable polyurethane foam not disclosed in Bigelow.

U.S. Pat. No. 4,470,227 to Bigelow discloses a building core. The present invention involves the use of a pourable polyurethane foam not disclosed in Bigelow.

U.S. Pat. No. 4,574,533 to Bigelow discloses a portable home. The present invention involves the use of a pourable polyurethane foam not disclosed in Bigelow.

U.S. Pat. No. 4,637,179 to Bigelow discloses a knock-down building. The present invention involves the use of a pourable polyurethane foam not disclosed in Bigelow.

U.S. Pat. No. 5,491,934 to Bigelow discloses a two-story building collapsed for shipping. The present invention involves the use of a pourable polyurethane foam not disclosed in Bigelow.

U.S. Pat. No. 5,864,992 to Bigelow discloses a roof and portable building. The present invention involves the use of a pourable polyurethane foam not disclosed in Bigelow.

U.S. Pat. No. 6,085,470 to Bigelow discloses a portable building. The present invention involves the use of a pourable polyurethane foam not disclosed in Bigelow.

U.S. Pat. No. 6,088,969 to Bigelow discloses a roof and portable building. The present invention involves the use of a pourable polyurethane foam not disclosed in Bigelow.

U.S. Pat. No. 6,240,684 to Bigelow discloses a portable automotive service building. The present invention involves the use of a pourable polyurethane foam not disclosed in Bigelow.

U.S. Pat. No. 6,295,766 to Bigelow discloses a prefabricated building. The present invention involves the use of a pourable polyurethane foam not disclosed in Bigelow.

U.S. Pat. No. 6,332,298 to Bigelow discloses a portable building construction. The present invention involves the use of a pourable polyurethane foam not disclosed in Bigelow.

U.S. Pat. No. 6,341,468 to Bigelow discloses a building with an attic module. The present invention involves the use of a pourable polyurethane foam not disclosed in Bigelow.

U.S. Pat. No. 6,862,847 to Bigelow discloses a prefabricated building. The present invention involves the use of a pourable polyurethane foam not disclosed in Bigelow.

U.S. Pat. No. 3,963,395 to Bourdo discloses a mass production line for fabricating structural building members. The present invention involves the use of a pourable polyurethane foam not disclosed in Bourdo.

U.S. Pat. No. 5,371,990 to SalahUddin discloses element-based foam and concrete modular wall construction and method apparatus therefor. The present invention involves the use of a pourable polyurethane foam not disclosed in SalahUddin.

U.S. Pat. No. 5,649,401 to Harrington, Jr. discloses a foam and channel concrete form system. The present invention involves the use of a pourable polyurethane foam not disclosed in Harrington, Jr.

U.S. Pat. No. 5,921,046 to Hammond, Jr. discloses a prefabricated building system for walls, roofs, and floors using a foam core building panel and connectors. The present invention involves the use of a pourable polyurethane foam not disclosed in Hammond, Jr.

U.S. Pat. No. 6,332,304 to Fuhrman discloses housing panels, encapsulated, with steel frames. The present invention involves the use of a pourable polyurethane foam not disclosed in Fuhrman.

U.S. Pat. No. 6,630,249 to Kennedy discloses composite steel structural plastic sandwich plate systems. The present invention involves the use of a pourable polyurethane foam not disclosed in Kennedy.

U.S. Pat. No. 6,703,331 to Bruce discloses a fungus resistant gypsum-based substrate. The present invention involves the use of a pourable polyurethane foam not disclosed in Bruce.

U.S. Pat. No. 6,729,094 to Spencer, et al. discloses pre-fabricated building panels and method of manufacture. The present invention involves the use of a pourable polyurethane foam not disclosed in Spencer, et al.

U.S. Pat. No. 8,613,172 to Olson, et al. discloses a composite panel including pre-stressed concrete with support frame, and method for making same. The present invention involves the use of a pourable polyurethane foam not disclosed in Olson, et al. Olson lacks the use of pourable polyurethane foam and therefore uses materials, such as concrete which has significant weight increase over the foam and would make panels restrictively heavy when in use. The present invention's use of foam allows for lightweight panels that provide the same strength benefits of the concrete of Olson, but at a fraction of the weight, therein making the panels more maneuverable in the present invention than those of Olson.

U.S. Pat. No. 8,877,329 to Ciuperca discloses high performance, highly energy efficient precast composite insulated concrete panels. The present invention involves the use of a pourable polyurethane foam not disclosed in Ciuperca. Ciuperca lacks the use of cabling with eyelets for both securing and lifting panel sections as found in the present invention.

US 2002/0014051 to Fraval, et al. discloses a high strength lightweight fiber ash composite material, method of manufacture thereof and prefabricated structural building members using the same. The present invention involves the use of a pourable polyurethane foam not disclosed in Fraval, et al.

US 2004/0111997 to Gigiakos discloses an apparatus and method for fabricating foam wall panels. The present invention involves the use of a pourable polyurethane foam not disclosed in Gigiakos.

US 2005/0000178 to Rodgers, et al. discloses poured-in-place concrete construction components and method of construction. The present invention involves the use of a pourable polyurethane foam not disclosed in Rodgers, et al.

US 2006/0174572 to Tonyan, et al. discloses non-combustible reinforced cementitious lightweight panels and metal frame system for shear walls. The present invention involves the use of a pourable polyurethane foam not disclosed in Tonyan, et al.

US 2006/0185267 to Tonyan, et al. discloses non-combustible reinforced cementitious lightweight panels and metal frame system for roofing. The present invention involves the use of a pourable polyurethane foam not disclosed in Tonyan, et al.

US 2007/0094992 to Antonic discloses structural wall panel assemblies. The present invention involves the use of a pourable polyurethane foam not disclosed in Antonic.

US 2007/0245660 to Scott, et al. discloses wall construction system and method. The present invention involves the use of a pourable polyurethane foam not disclosed in Scott, et al.

US 2008/0134589 to Abrams, et al. discloses a system for modular building construction. The present invention involves the use of a pourable polyurethane foam not disclosed in Abrams, et al.

US 2008/0295425 to Farag discloses a panel-sealing and securing system. The present invention involves the use of a pourable polyurethane foam not disclosed in Farag.

US 2009/0293280 to Gharibeh, et al. discloses a method of making a composite building panel. The present invention involves the use of a pourable polyurethane foam not disclosed in Gharibeh, et al.

US 2013/0074432 to Ciuperca discloses an insulated concrete form and method of using same. The present invention involves the use of a pourable polyurethane foam not disclosed in Ciuperca.

US 2014/0059961 to Yin, et al. discloses prefabricated thermal insulating composite panel, assembly thereof, molded panel and concrete slab comprising same method and mold profile for prefabricating same. The present invention involves the use of a pourable polyurethane foam not disclosed in Yin, et al.

US 2014/0115988 to Sievers, et al. discloses a prefabricated wall assembly having an insulation foam layer. The present invention involves the use of a pourable polyurethane foam not disclosed in Sievers, et al.

US 2009/0056258 to Currier discloses a forming apparatus system. The present invention involves the use of a pourable polyurethane foam and cable not disclosed in Currier.

U.S. Pat. No. 9,428,901 to Price discloses a modular building system. The present invention involves the use of a pourable polyurethane foam and cable not disclosed in Price.

U.S. Pat. No. 7,727,446 to Wolfe discloses a concrete floor manufacturing station. The present invention involves the use of a pourable polyurethane foam and cable not disclosed in Wolfe.

U.S. Pat. No. 6,698,710 to VanderWerf discloses a forming apparatus system. The present invention involves the use of a pourable polyurethane foam and cable not disclosed in VanderWerf.

U.S. Pat. No. 7,168,216 to Hagen discloses high performance, highly energy efficient precast composite insulated concrete panels. The present invention involves the use of a pourable polyurethane foam not disclosed in Hagen. Hagen lacks the use of cabling with eyelets for both securing and lifting panel sections as found in the present invention.

SUMMARY

The present invention is generally a building framework that can be insulated with a pourable structural foam that can be used as a structural polyurethane foam for floors, walls, ceiling, roof, or other structural assemblies. In some embodiments, the present invention allows for a consistent level of polyurethane, or structural foam materials for structural uses via the use of a pouring technique. In several embodiments, the present invention eliminates polyurethane or structural foam waste as found in spray and injection methods of applying polyurethane because in the present invention the polyurethane foam is poured. In several embodiments of the present invention, the pouring of the polyurethane or structural foam materials allows the materials to spread in a cell which increases surface area contact with the polyurethane or structural foam and the frame or partition beams. This also allows for self-leveling of the polyurethane or structural foam as well as elimination of air or gas pockets found in spray on polyurethanes and structural foams. In several embodiments of the present invention, the present invention uses cabling to improve movability of the invention, wind loading and seismic requirements. In several embodiments, the present invention uses cabling to tie down wall elements and pieces.

In several embodiments, the present invention eliminates polyurethane overspray as found in spray methods of applying polyurethane. In several embodiments, the present invention eliminates shaving and/or trimming of excess polyurethane materials as found in spray and injection methods of applying polyurethane. In several embodiments of the present invention, expensive air filtration and process equipment are eliminated from use in application. In several embodiments of the present invention, the polyurethane or structural foam can be poured using mechanical or manual methods into cells. In several embodiments of the present invention, the polyurethane or structural foam is slow setting with a slower cure time therein allowing for the polyurethane or structural foam to self-level off after being poured into cells.

In some embodiments, the bonding of the polyurethane to the frame structure of the present invention creates a monolithic structure with an increase in strength and thermal properties over the individual components. In several embodiments, the increase in strength would include, but not be limited to, tensile strength, wind loading, racking strength, sheer strength, and/or compressive strength, and combinations therein. In several embodiments, the monolithic structural nature of the module is created by the uniform bond of the polyurethane or structural foam because after it is cured it forms a uniform bond within the entire structure without any of the air or gas pocket gaps found in the nonpoured prior art polyurethane or structural foam applications.

In many embodiments, the present invention provides increased fire ratings and thermal performance over other known building materials. In several embodiments, the polyurethane or structural foam is comprised of a Class 1 fire rated material. In several embodiments, the present invention's ballistic and blast mitigation may be achieved by incorporating various materials when pouring the foam. In several embodiments, these materials can include Nomex, nanobead ballistic pourable materials mixed with the polyurethane or structural foam, overcoating materials to apply after or before pouring the polyurethane structural foam, or other blast mitigating materials.

In several embodiments, the present invention is comprised of components that are assembled with fire rated polyurethane foam and structural steel components. In several embodiments, the present invention is a structure that is impervious to rotting and/or deterioration from moisture.

In several embodiments, the present invention is termite resistant. In several embodiments, the present invention completely eliminates the use of wood. In several embodiments, after a catastrophic event, the present invention eliminates the need to remove insulation due to flooding. In several embodiments, the present invention minimizes repairs in case of flooding.

In several embodiments, the assembly of components of the present invention is achieved in a process where polyurethane or structural foam and/or a similar composite is poured into the structure to strengthen the assembly for various loads, which include, but are not limited to: wind, compression, sheer, and tensile strength. In several embodiments, the polyurethane or structural foam can be poured into a frame cell individually, or into many cells at once.

In several embodiments, the pouring of the polyurethane materials in a precise manner allows for electrical and/or plumbing to be run inside a wall between the interior surface and the cavity created between the insulation and interior finished surface. This method of assembly allows for a closed wall panelized system. In several embodiments of the present invention, the polyurethane or structural foam is a dense cellular plastic material designed to retard moisture.

In several embodiments, the present invention can be used for walls, roofs and floor sheeting comprised of non-wood material.

In several embodiments, cables, or cabling systems, will be added to the wall, floor and roof systems during manufacturing and may remain in the components after assembly. In several embodiments, cables, or cabling systems, can run vertically and/or horizontally through the wall components of the invention. In several embodiments, cables, or cabling systems, can be used to connect the wall, floor and roof together for wind loading and/or seismic requirements. In some embodiments, cables, or cabling systems, included in wall, floor and roof system may be used to tie components to the foundation whether it is a concrete slab, piers, grade beam, blocks, or the like. In some embodiments, cables or cabling systems, are used for safety in lifting and handling the components during the manufacturing process, loading, unloading and assembly. In some embodiments, the cable provides more structural integrity by being inserted through frame beams and more evenly distributing weight during moving and assembly.

In some embodiments, the present invention is a building component utilizing a pourable polyurethane or structural foam that can be used as a structural polyurethane or structural foam for floors, walls, and roof assemblies comprising: a frame with an interior, back and a front; multiple partition beams forming cells in said frame; pourable polyurethane foam; exterior backing attached to said frame back; and interior backing; wherein said polyurethane is poured into said cells to a desired level, and after said polyurethane is poured into said cells, said interior backing is attached to said frame front.

In some embodiments, the present invention of the pourable polyurethane or structural foam has increased thermal properties which include increased fire ratings and thermal performance. In some embodiments, the pourable polyurethane or structural foam has ballistic and blast mitigation by incorporating various materials when pouring said polyurethane foam. In some embodiments, the frame is comprised of a structural steel component. In several embodiments, the pourable polyurethane or structural foam is moisture resistant. In several embodiments, electrical equipment is attached to said frame interior prior to attaching said interior backing to said frame front. In several embodiments, the electrical equipment is installed to said frame interior without contact to said pourable polyurethane foam.

In several embodiments, the present invention is a building component utilizing a pourable structural foam that can be used as a structural polyurethane or structural foam for floors, walls, ceiling and roof assemblies comprising: a bonding polyurethane that adheres to the frame structure with an interior portion creating a monolithic structure with an increase in strength and thermal properties, with said strength increasing properties including, but not limited, to tensile strength, wind loading strength, racking strength, sheer strength, and/or compressive strength, and combinations therein; and a cable located partially outside of said frame structure and traversing at least an interior portion of said frame structure. In several embodiments, the cable is comprised of multiple cables. In several embodiments, the multiple cables can intersect each other through said frame.

In several embodiments, the present invention is a building component utilizing a pourable structural foam that can be used as a structural foam for floors, walls, ceiling and roof assemblies comprising: a frame with an interior, back and a front; multiple partition beams forming cells in said frame; pourable structural foam; exterior backing attached to said frame back; and interior backing; a cable located partially outside of said frame structure and traversing at least an interior portion of said frame structure; wherein said structural foam is poured into said cells to a desired level and after said structural foam is poured into said cells said interior backing is attached to said frame front. In several embodiments, the cable is comprised of multiple cables. In several embodiments, the multiple cables can intersect each other through said frame. In some embodiments, the cable provides more structural integrity by being inserted through frame beams and more evenly distributing weight during moving and assembly.

In some embodiments, the present invention is a building panel component comprising: a non-pressure injected pourable structural foam used as a structural polyurethane or structural foam for floors, walls, ceiling and roof assemblies; a frame structure; wherein said frame is partially filled, in an open cavity pour, with said structural polyurethane or structural foam to allow for utility equipment to be installed without interfacing with said structural foam comprising: a bonding polyurethane that adheres to the frame structure, in a manner circumventing the need to trim said polyurethane; wherein said bonding polyurethane foam creates a monolithic structure with said frame with an increase in strength and thermal properties, said strength increasing properties including, but not limited, to tensile strength, wind loading strength, racking strength, sheer strength, and/or compressive strength, and combinations therein; and at least one cable set with first eyelets located partially outside of said frame structure and traversing at least a partial interior portion of said frame structure above said structural foam; wherein said cable set with first eyelets is used to hoist said building panel and to attach said building panel to other building materials. In some embodiments, the cabling is used to initially handle components in manufacturing, loading and unloading, and final assembly tying components together for greater wind and or seismic loading. In several embodiments, the eyelets may be comprised from the cable using crimping, shackling, stitching or welding. In several embodiments, the cable system allows for greater safety during manufacturing, loading and unloading of individual wall panels or wall sections.

In some embodiments, the pourable structural foam has ballistic and blast mitigation that may be achieved by incorporating various nanobead ballistic pourable materials when pouring said structural foam. In some embodiments, said frame structure is comprised of a structural steel component. In some embodiments, the pourable structural foam is moisture resistant. In some embodiments, said pourable structural foam is a polyurethane foam. In some embodiments, said cable set is comprised of multiple cables. In some embodiments, said cable set fully traverses the interior portion of said frame structure. In some embodiments, multiple cables can intersect each other through said frame. In several embodiments, the cable system allows for greater safety during manufacturing, loading and unloading of individual wall panels or wall sections.

In some embodiments, said invention is a building component utilizing a non-pressure injected pourable structural foam that can be used as a structural foam for floors, walls, ceiling and roof assemblies wherein said building component is partially filled, in an open cavity pour, with said structural polyurethane or structural foam to allow for utility equipment to be installed without interfacing with said structural foam comprising: a frame with an interior, back and a front; multiple partition beams forming cells in said frame; pourable structural foam; exterior backing attached to said frame back; and interior backing; at least one cable set with first eyelets located partially outside of said frame structure and traversing at least an interior portion of said frame structure above said structural foam; wherein said cable set with first eyelets is used to hoist said building panel and to attach said building panel to other building materials; wherein said structural foam, in a manner circumventing the need to trim said polyurethane, is poured into said cells to a desired level, and after said structural foam is poured into said cells said interior backing is attached to said frame front.

In some embodiments, said frame is comprised of a structural steel component. In some embodiments, said electrical equipment is attached to said frame interior prior to attaching said interior backing to said frame front. In some embodiments, said electrical equipment is installed to said frame interior without contact to said pourable structural foam.

In some embodiments, the invention is a building panel component utilizing a non-pressure injected pourable structural foam that can be used as a structural foam for floors, walls, ceiling and roof assemblies wherein said building panel component is partially filled, in an open cavity pour, with said structural polyurethane or structural foam to allow for utility equipment to be installed without interfacing with said structural foam comprising: a structural frame with an interior, back and a front; multiple partition beams forming cells in said interior of said frame; non-pressure injected pourable structural foam; exterior backing attached to said frame back; and interior backing; at least one first cable set with eyelets located partially outside of said frame structure and traversing at least an interior portion of said frame structure above said structural foam; wherein said first cable set with eyelets is used to hoist said building panel and to attach said building panel to other building materials; at least one second cable set with eyelets located partially outside of said frame structure and traversing at least an interior portion of said frame structure above said structural foam; wherein said second cable set with eyelets is used to hoist said building panel and to attach said building panel to other building materials; wherein said first cable set and said second cable set intersect each other in said interior of said frame; wherein said structural foam, in a manner circumventing the need to trim said polyurethane, is poured into said cells to a desired level and after said structural foam is poured into said cells said interior backing is attached to said frame front.

In some embodiments, there is a second building panel component utilizing a non-pressure injected pourable structural foam that can be used as a structural foam for floors, walls, ceiling and roof assemblies wherein said building panel component is partially filled, in an open cavity pour, with said structural polyurethane or structural foam to allow for utility equipment to be installed without interfacing with said structural foam comprising: a second structural frame with an interior, back and a front; a second set of multiple partition beams forming cells in said interior of said frame; a second non-pressure injected pourable structural foam; a second exterior backing attached to said frame back; and a second interior backing; at least one third cable set with eyelets located partially outside of said frame structure and traversing at least an interior portion of said frame structure above said structural foam; wherein said third cable set with eyelets is used to hoist said building panel and to attach said building panel to other building materials; at least one fourth cable set with eyelets located partially outside of said frame structure and traversing at least an interior portion of said frame structure above said structural foam; wherein said fourth cable set with eyelets is used to hoist said building panel and to attach said building panel to other building materials; wherein said first cable set and said second cable set intersect each other in said interior of said frame; wherein said second structural foam, in a manner circumventing the need to trim said polyurethane, is poured into said cells to a desired level, and after said second structural foam is poured into said cells said interior backing is attached to said frame front; and said third cable set is attached to said first cable set via said first eyelets and said third eyelets.

In some embodiments, a second building panel component utilizing a non-pressure injected pourable structural foam that can be used as a structural foam for floors, walls, ceiling and roof assemblies wherein said building panel component is partially filled, in an open cavity pour, with said structural polyurethane or structural foam to allow for utility equipment to be installed without interfacing with said structural foam comprising: a second structural frame with an interior, back and a front; a second set of multiple partition beams forming cells in said interior of said frame;

a second non-pressure injected pourable structural foam; a second exterior backing attached to said frame back; and a second interior backing; at least one third cable set with eyelets located partially outside of said frame structure and traversing at least an interior portion of said frame structure above said structural foam; wherein said third cable set with eyelets is used to hoist said building panel and to attach said building panel to other building materials; at least one fourth cable set with eyelets located partially outside of said frame structure and traversing at least an interior portion of said frame structure above said structural foam; wherein said fourth cable set with eyelets is used to hoist said building panel and to attach said building panel to other building materials; wherein said first cable set and said second cable set intersect each other in said interior of said frame; wherein said second structural foam, in a manner circumventing the need to trim said polyurethane, is poured into said cells to a desired level, and after said second structural foam is poured into said cells said interior backing is attached to said frame front; and a third building panel; wherein said third cable set is attached to said first cable set via said first eyelets and said third eyelets; and said second cable set and said fourth cable set is attached to said third building panel via said second cable set and said fourth cable set. In some embodiments, said building panel component can be hoisted by at least one first cable set with eyelets.

BRIEF DESCRIPTION OF THE DRAWINGS

For a more complete understanding of the present disclosure and the advantages thereof, reference is now made to the following descriptions to be taken in conjunction with the accompanying drawings describing specific embodiments of the disclosure, wherein.

DETAILED DESCRIPTION

Figure 1:
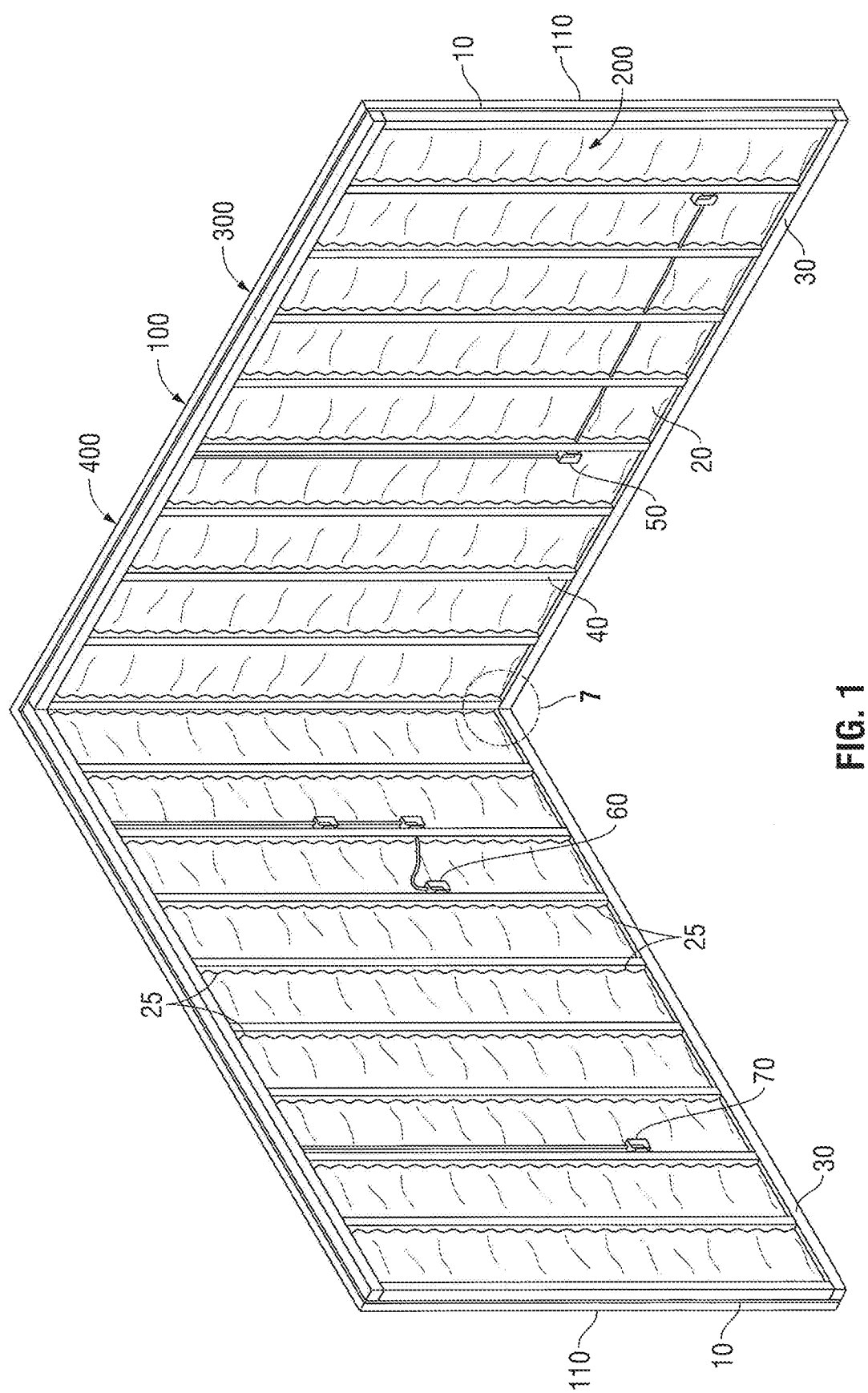
FIG. 1 is a partially angled view of one embodiment of the present invention as assembled as a wall juncture.

One or more illustrative embodiments incorporating the invention disclosed herein are presented below. Applicant has created a revolutionary and novel wall, roof, and floor design with pourable polyurethane or structural foam insulation with cabling to improve movability of the invention, wind loading and seismic requirements. The cable can be comprised of multiple cables. Multiple cables can intersect each other through said frame. Cabling, or a cable set can be used for securing panels, anchoring panels, or lifting panels for transportation. The cabling may be comprised of a high tensile strength steel cable, polymer cable, synthetic cable, polyweb-sling, cable or rope. In some embodiments, the cabling is used to initially handle components in manufacturing, loading and unloading, and final assembly tying components together for greater wind and or seismic loading. In several embodiments, the cable system allows for greater safety during manufacturing, loading and unloading of individual wall panels.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, New Edition, 2016. Definitions and/or interpretations should not be incorporated from other patent applications, patents, or publications, related or not, unless specifically stated in this specification or if the incorporation is necessary for maintaining validity. Specifically defined terms: the term "wall module" means any structural component which can be used as a wall, floor, roof, ceiling or a solid barrier construction. As utilized herein, "wall modules" can be portable or permanent structures. As utilized herein, the "frame" and the "partition barriers" can be defined to be any three-dimensional structures used in construction for a solid barrier. "Electrical Equipment" as defined herein can include, but is not limited to, electrical wiring, plumbing chases, air space, ducting, and other materials normally associated with the spaces between interior and exterior wall faces. "Cable", "cable set", or "cabling" as defined herein can include, but is not limited to, a thick rope of wire, nonmetallic fiber, or other material typically used for construction. In several embodiments, the "cable", "cable set", or "cabling" can be steel, nylon, rope, strap materials or binding material. "Cable" or "cable set" may be used interchangeably throughout the specification. "Cable", "cable set", or "cabling" may contain one, or multiple cables. The terms "bottom", "top", and "side" as used herein are relative to each other, in that "bottom" is parallel to "top" and a "side" is parallel to another "side". The cabling may be comprised of a high tensile strength steel cable, polymer cable, synthetic cable, polyweb-sling, cable or rope. In several embodiments of the present invention, the eyelets may be comprised from the respective cable using crimping, shackling, stitching or welding. In several embodiments, the cable system allows for greater safety during manufacturing, loading and unloading of individual wall panels or wall sections. In some embodiments, the cable provides more structural integrity by being inserted through frame beams and more evenly distributing weight during moving and assembly. In some embodiments, the cable provides more structural integrity by being inserted through frame beams and more evenly distributing weight during moving and assembly. In several embodiments, the frame can be comprised of different elements including, but not limited to, steel, wood, fiberglass, aluminum, polyurethane, or composite materials. In several embodiments, safety is also improved during the manufacturing process, loading, unloading, and in final assembly. In several embodiments, the cabling improves the efficiencies of manufacturing and assembly of the present invention.

In several embodiments of the present invention, a "bottom" can be perpendicular to the ground, or even located a further distance from the ground than a "top". The term "eyelet" as used herein can be a construction eyelet, loop in a cable, clamp, loop on a hook, shackle, clevis, or other attachment as used in construction. In some embodiments, the cabling is used to initially handle components in manufacturing, loading and unloading, and final assembly tying components together for greater wind and or seismic loading.

In many embodiments, components can be rotated, moved laterally, moved horizontally, or moved in relationship to each other.

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

FIG. 1 is a partially angled view of one embodiment of the present invention as assembled as a wall juncture 400. The juncture 7 is the focus of FIG. 7A-C. As shown, the present invention is pourable polyurethane or structural foam 20 used as a structural polyurethane or structural foam for floors, walls, and roof assemblies, as shown in FIG. 1, wall module 100. In some embodiments, the pourable polyurethane or structural foam 20 can be a two-part rigid polyurethane or structural foam system. In some embodiments, polyurethane or structural foam 20 can bond multiple non-porous surfaces, porous surfaces, or combinations therein. In some embodiments, polyurethane foam is an all-weather use foam. In some embodiments, polyurethane or structural foam 20 can be applied in temperatures ranging from 40-140° F. In some embodiments, polyurethane or structural foam 20 is fire retardant when dry. In several embodiments, the polyurethane or structural foam is comprised of a Class 1 fire rated material. In some embodiments, polyurethane or structural foam 20 is mold and water damage resistant.

As shown, wall module 100 generally has an interior face 200 and an outer face 300. Each wall module 100 could also function as a ceiling or floor module in application. In many embodiments, outer face 300 can be the face of the wall closest to the outside of a structure. In many embodiments, outer face 300 has a solid backing 10 which can be comprised of wood, metal, composite material or other construction materials utilized for the construction of a wall face. In several embodiments, solid backing 10 may be constructed of moisture resistant materials. In several embodiments of the present invention, the polyurethane or structural foam is a dense cellular plastic material designed to retard moisture. In several embodiments, solid backing 10 may be constructed of heat resistant and/or flame-retardant materials.

In several embodiments, solid backing 10 may be constructed of enhanced materials with increased tensile and modular strength. In several embodiments, the monolithic structural nature of the module is created by the uniform bond of the polyurethane or structural foam 20 because after it is cured it forms a uniform bond within the entire structure without any of the air or gas pocket gaps found in the nonpoured prior art polyurethane or structural foam applications. In several embodiments of the present invention, the foam 20 is non-pressurized filled.

In several embodiments, (FIG. 7A-C) solid backing 10 can be coated with a vapor barrier 110. In some embodiments, backing 10 may be a lightweight cement tile backerboard. In some embodiments, backing 10 is water durable and composed of a mold-resistant substrate. In some embodiments, backing 10 is non-combustible. In some embodiments, backing 10 mitigates blasts and explosions. In several embodiments, blast mitigation materials can include Nomex, nanobead ballistic pourable materials mixed with the polyurethane or structural foam 20, overcoating materials to apply after or before pouring the polyurethane or structural foam 20, or other blast mitigating materials.

As shown, solid backing 10 is preferably attached to a frame 30. Frame 30 can be comprised of wood, metal, composite material or other construction materials utilized for the construction of a wall frame. In several embodiments, frame 30 may be constructed of moisture resistant materials. In several embodiments, frame 30 may be constructed of heat resistant and/or flame-retardant materials. In several embodiments, frame 30 may be constructed of enhanced materials with increased tensile and modular strength. The geometric shape of frame 30 can vary per user needs. In some embodiments, frame 30 is water durable and composed of a mold-resistant substrate. In some embodiments, frame 30 is non-combustible. This aspect of the present invention is of economic and material benefit to any end user over the prior art. In some embodiments, frame 30 mitigates blasts and explosions by using Nomex, nanobead ballistic pourable materials mixed with the polyurethane or structural foam 20, overcoating materials to apply after or before pouring the polyurethane or structural foam 20, or other blast mitigating materials. In several embodiments, the frame 30 can be comprised of different elements including, but not limited to, steel, wood, fiberglass, aluminum, polyurethane, or composite materials.

As shown, separating frame 30 into various cells 26 (FIG. 3A) are partition beams 40. Partition beams 40 can be comprised of wood, metal, composite material or other construction materials utilized for the construction of a wall frame. In several embodiments, partition beams 40 may be constructed of moisture resistant materials. In several embodiments, partition beams 40 may be constructed of heat resistant and/or flame-retardant materials. In several embodiments, partition beams 40 may be constructed of enhanced materials with increased tensile and modular strength. The geometric shape of partition beams 40 can vary per user needs. In some embodiments, partition beams 40 are water durable and composed of a mold-resistant substrate. In some embodiments, partition beams 40 are non-combustible. In some embodiments, partition beams 40 mitigate blasts and explosions. This aspect of the present invention is of economic and material benefit to any end user over the prior art as the present invention is more resistant to blasting, wind lift, or seismic damage. In several embodiments, partition beams 40 and frame 30 are assembled together as is known in the art.

As shown, between partition beams 40 is pourable polyurethane or structural foam 20. In some embodiments, the present invention allows for a consistent level of polyurethane or structural foam 20 for structural uses. In several embodiments, the present invention eliminates polyurethane or structural foam 20 waste as found in spray and injection methods of applying polyurethane as known in previous art. In several embodiments, the present invention eliminates polyurethane overspray as found in spray methods of applying polyurethane. In several embodiments, the present invention eliminates shaving and/or trimming of excess polyurethane materials as found in spray and injection methods of applying polyurethane. This aspect of the present invention is of economic and material benefit to any end user over the prior art.

In several embodiments of the present invention, expensive air filtration and process equipment are eliminated from use in application of the polyurethane or structural foam 20. In some embodiments, the bonding of the polyurethane or structural foam 20 to the frame structure 30 creates a monolithic structure with an increase in strength and thermal properties over the individual components. In several embodiments, the increase in strength of wall module 100 would include, but not be limited to, tensile strength, wind loading, racking strength, sheer strength, and/or compressive strength, and combinations therein. This aspect of the present invention is of economic and material benefit to any end user over the prior art.

Figure 2:
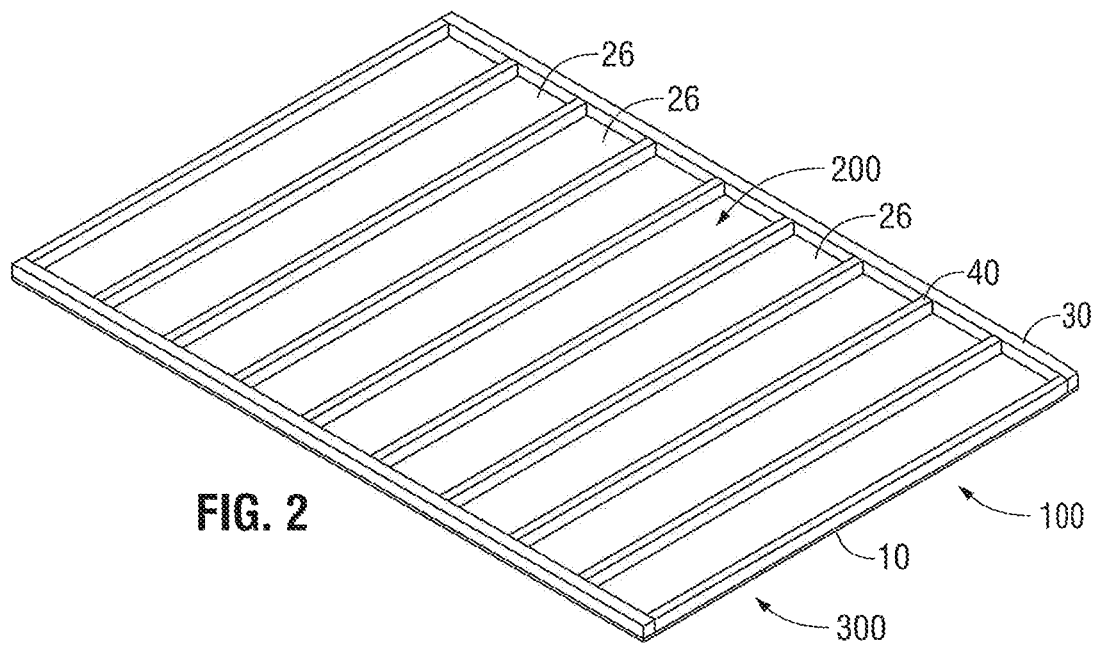
FIG. 2 is an angled top view of one embodiment of the frame and backing of the present invention.

In several embodiments of the present invention, the polyurethane or structural foam 20 can be poured using mechanical or manual methods into cells 26 (See FIG. 2). In several embodiments of the present invention, the polyurethane or structural foam 20 is slow setting with a slower cure time therein allowing for the polyurethane or structural foam 20 to self-level off after being poured into cells 26 (FIG. 2).

In several embodiments of the present invention, the polyurethane or structural foam 20 can adhere to the partition beams 40 at interfaces 25. Interfaces 25, the bonding of the polyurethane or structural foam 20 to the frame structure 30, creates a monolithic structure with an increase in strength and thermal properties over the individual components.

In several embodiments, electrical equipment 60, 70 and wiring 50 can be attached to the frame structure 30 or the partition beams 40. In many embodiments of the present invention, the electrical equipment 60, 70, and wiring 50 are not in physical contact with the polyurethane or structural foam 20. Since the electrical equipment 60, 70 and wiring 50 is not in contact with the polyurethane or structural foam 20, this means that that repair or replacement of the electrical equipment 60, 70 and wiring 50 does not require destruction, movement or manipulation of the polyurethane or structural foam 20. This aspect of the present invention is of economic and material benefit to any end user over the prior art.

FIG. 2 is an angled top view of one embodiment of the frame and backing of the present invention. As shown, solid backing 10 is preferably attached to a frame 30. As shown, separating frame 30 into various cells 26 are partition beams 40. As shown, wall module 100 generally has an interior face 200 and an outer face 300. Each wall module 100 could also function as a ceiling or floor module in application. In many embodiments, outer face 300 can be the face of the wall closest to the outside of a structure. In many embodiments, outer face 300 has a solid backing 10. In several embodiments, solid backing 10 is lightweight.

Figure 3A:
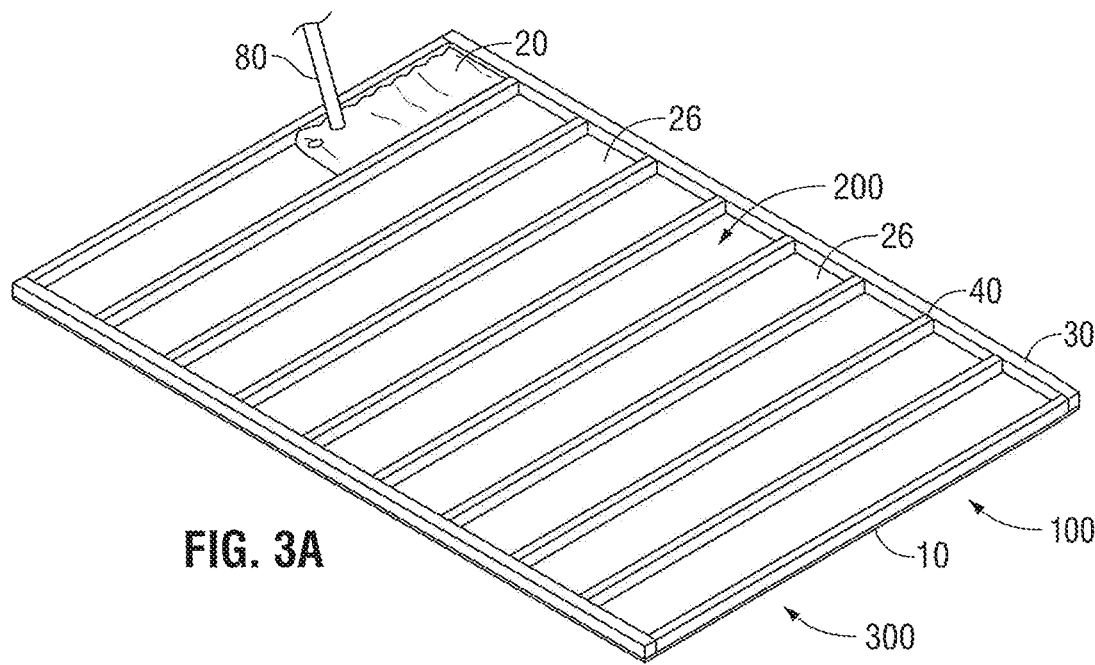
FIG. 3A is an angled top view of one embodiment of the frame and backing of the present invention with filler/adhesive material being added to one cell of the frame and backing.

FIG. 3A is an angled top view of one embodiment of the frame and backing of the present invention with polyurethane or structural foam 20 being poured into a cell. As shown, solid backing 10 is preferably attached to a frame 30. The solid backing 10 can be attached to frame 30 in a manner known in the art. As shown, separating frame 30 into various cells 26 are partition beams 40. In several embodiments, it is preferred to have the polyurethane or structural foam 20 poured when the frame 30 is flat against a surface. In several embodiments of the present invention, the pouring of the polyurethane or structural foam 20 materials allows the materials to spread in a cell which increases surface area contact with the polyurethane or structural foam 20 and the frame 30 or partition beams 40. This also allows for self-leveling of the polyurethane or structural foam 20 as well as elimination of air or gas pockets found in spray on polyurethanes and structural foams.

As shown, wall module 100 generally has an interior face 200 and an outer face 300. Each wall module 100 could also function as a ceiling or floor module in application. In many embodiments, each wall module 100 can be used for a variety of applications in building structures. In many embodiments, outer face 300 can be the face of the wall closest to the outside of a structure. In many embodiments, outer face 300 has a solid backing 10. As shown, the polyurethane or structural foam 20 is being poured into cell 26 by a stylized pouring tube 80.

Figure 3B:
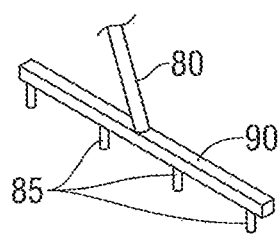
FIG. 3B is a variant of one embodiment of the polyurethane pouring tube of the present invention.

As shown in FIG. 3B, the pouring tube 80 may be configured with a central hollow chamber 90 with variant pouring nozzles 85. The variant pouring nozzles 85 can be of any number and hollow chamber 90 can be of any variant size to allow for the filling of multiple cells 26 at the same time with polyurethane or structural foam 20.

Figure 4:
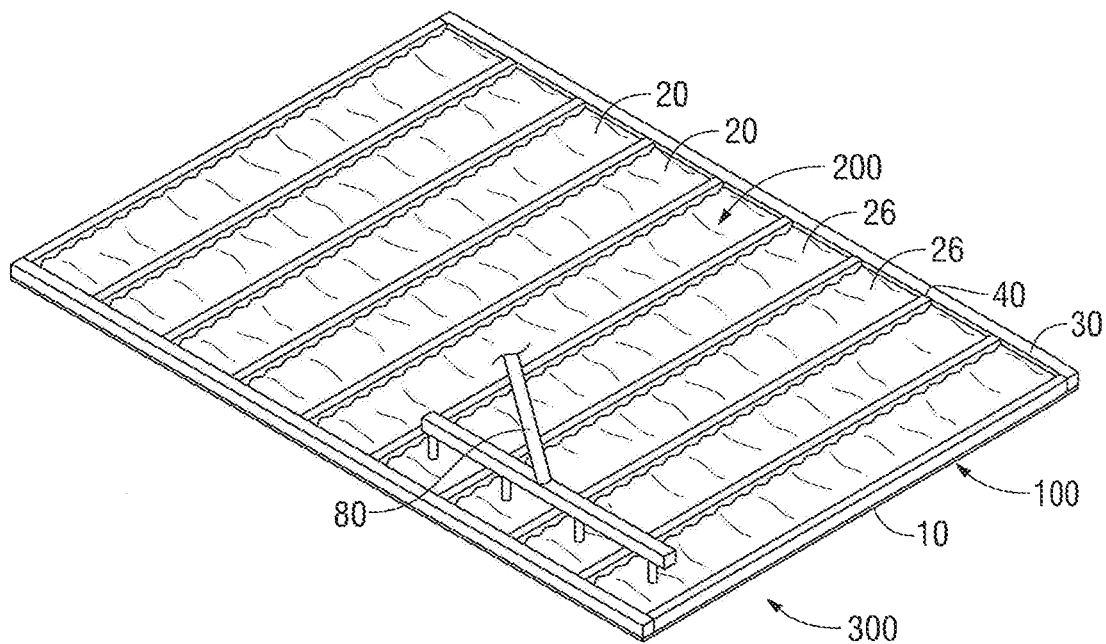
FIG. 4 is an angled top view of one embodiment of the frame and backing of the present invention with filler/adhesive material being added to multiple cells of the frame and backing.

FIG. 4 is an angled top view of one embodiment of the frame and backing of the present invention with polyurethane or structural foam 20 being poured into a cell 26. As shown, solid backing 10 is preferably attached to a frame 30. As shown, separating frame 30 into various cells 26 are partition beams 40. In many embodiments, outer face 300 can be the face of the wall closest to the outside of a structure. In many embodiments, outer face 300 has a solid backing 10. As shown, the polyurethane or structural foam 20 has been poured into cells 26 by a stylized pouring tube 80. In several embodiments of the present invention, the polyurethane or structural foam 20 is poured into the cells 26 leaving a layer of space between the depth of the frame 30 and the partition beams 40 that is free of polyurethane or structural foam 20. In several embodiments of the present invention, the pouring of the polyurethane or structural foam 20 materials allows the materials to spread in a cell which increases surface area contact with the polyurethane or structural foam 20 and the frame 30 or partition beams 40. This also allows for self-leveling of the polyurethane or structural foam 20 as well as elimination of air or gas pockets found in spray on polyurethanes and structural foams.

Figure 5:
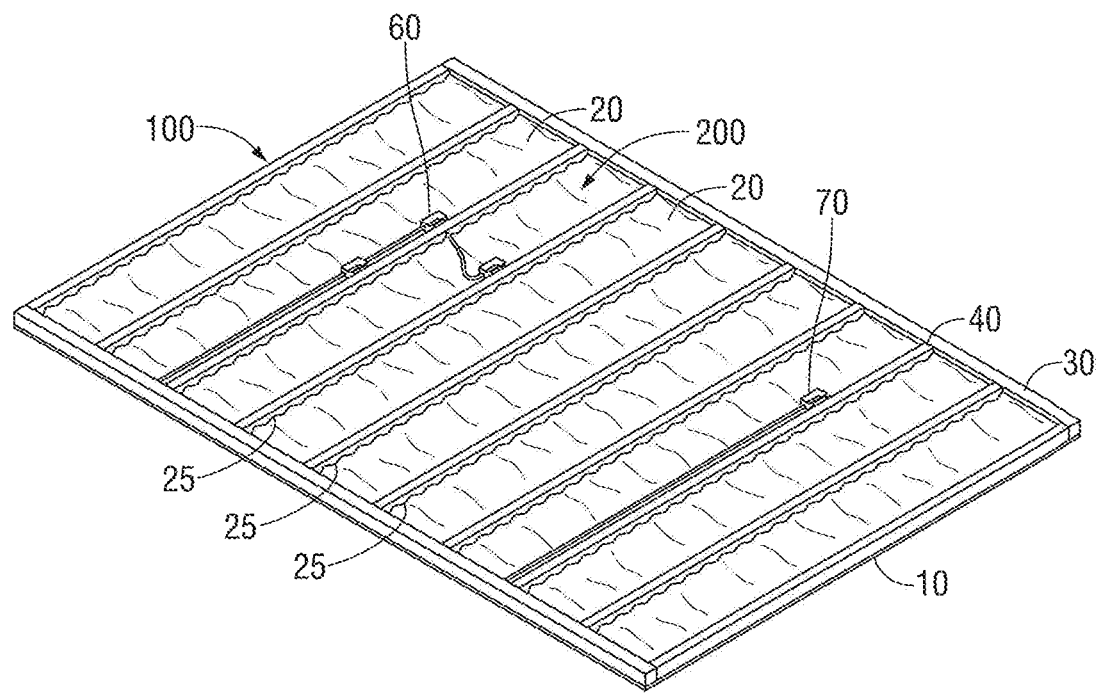
FIG. 5 is an angled top view of one embodiment of the frame and backing of the present invention with all cells of the frame and backing with electrical equipment attached.

FIG. 5 is an angled top view of one embodiment of the frame and backing of the present invention with all cells of the frame and backing with electrical equipment and/or wiring attached. In several embodiments, electrical equipment 60, 70 and wiring 50 (see FIG. 1) can be attached to the frame structure 30 or the partition beams 40. In many embodiments of the present invention, the electrical equipment 60, 70, and wiring 50 (see FIG. 1) are not in physical contact with the polyurethane or structural foam 20.

Figure 6:
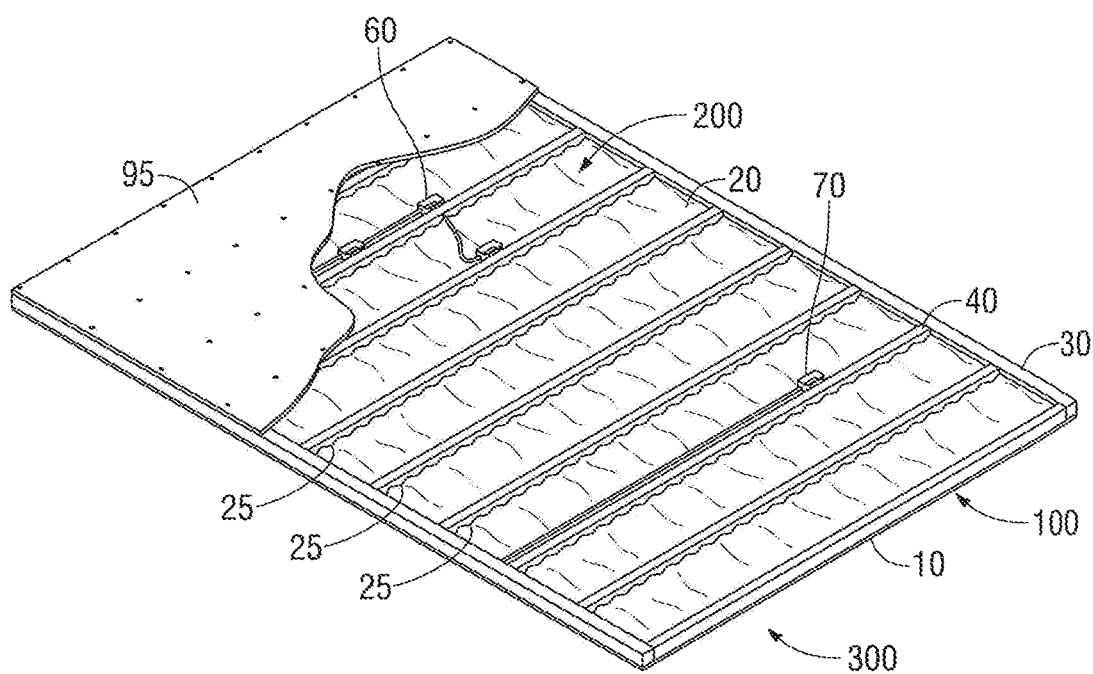
FIG. 6 is an angled top cross-sectional view of one embodiment of the frame with front and rear backing of the present invention with all cells of the frame filled with polyurethane or structural foam and electrical wiring is attached.

FIG. 6 is an angled top cross-sectional view of one embodiment of the frame with front and rear backing of the present invention with all cells of the frame filled and some electrical equipment and wiring attached. In several embodiments, electrical equipment 60, 70 and wiring 50 (see FIG. 1) can be attached to the frame structure 30 or the partition beams 40. In many embodiments of the present invention, the electrical equipment 60, 70, and wiring 50 (see FIG. 1) are not in physical contact with the polyurethane or structural foam 20. In several embodiments, interior solid backing 95 has a solid backing 95 which can be comprised of wood, metal, composite material or other construction materials utilized for the construction of a wall face. In several embodiments, solid backing 95 may be constructed of moisture resistant materials. In several embodiments, solid backing 95 may be constructed of heat resistant and/or flame-retardant materials. In several embodiments, solid backing 95 may be constructed of enhanced materials with increased tensile and modular strength. In some embodiments, solid backing 95 may be a lightweight cement tile backerboard. In some embodiments, solid backing 95 is water durable and composed of a mold-resistant substrate. In some embodiments, solid backing 95 is non-combustible. In some embodiments, solid backing 95 mitigates blasts and explosions.

Figure 7A:
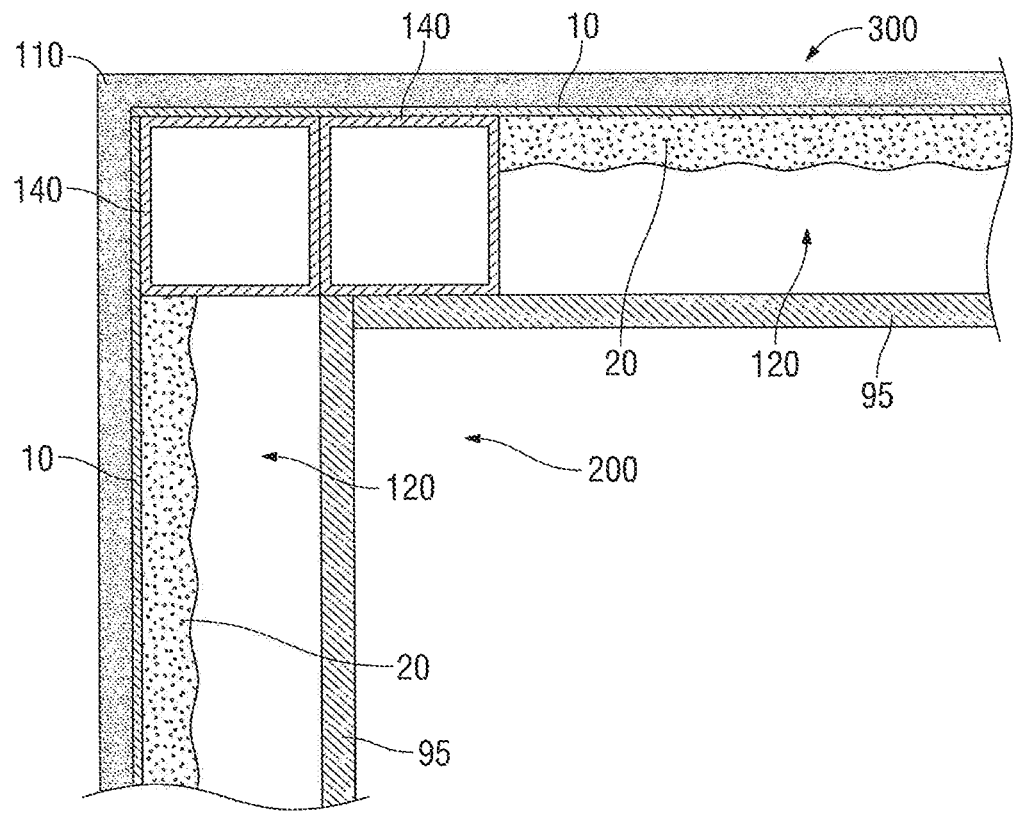
FIG. 7A is a top view cross-section of one embodiment of the frame and backing as joined to another embodiment of the frame and backing.

FIG. 7A is a top view cross-section of one embodiment of the frame and backing as joined to another embodiment of the frame and backing. As shown, two hollow partitions 140 contact each other. Also shown is interior air cavity 120 formed between solid backing 95 and polyurethane or structural foam 20. Further illustrated is vapor barrier 110 as applied to the exterior solid backing 10. As shown, the two partitions 140 may be hollow steel frames.

Figure 7B:
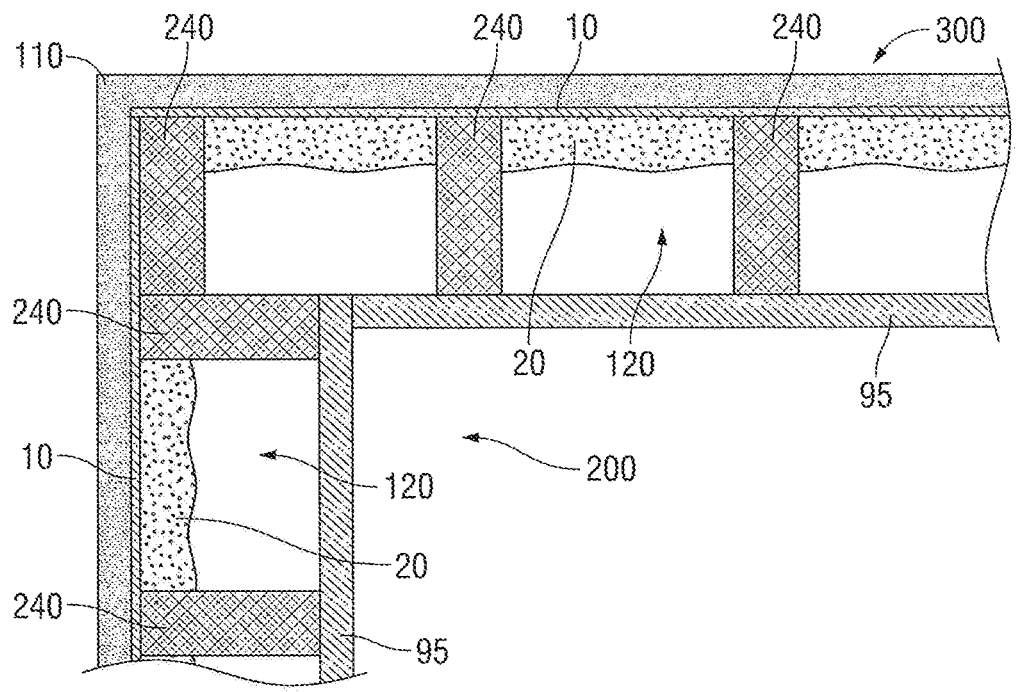
FIG. 7B is a top view cross-section of one embodiment of the frame and backing as joined to another embodiment of the frame and backing.

FIG. 7B is a top view cross-section of one embodiment of the frame and backing as joined to another embodiment of the frame and backing. As shown, two partitions 240 contact each other. Also shown is interior air cavity 120 formed between solid backing 95 and polyurethane or structural foam 20. Further illustrated is vapor barrier 110 as applied to the exterior solid backing 10. As shown, the two partitions 240 may be solid wood frames.

Figure 7C:
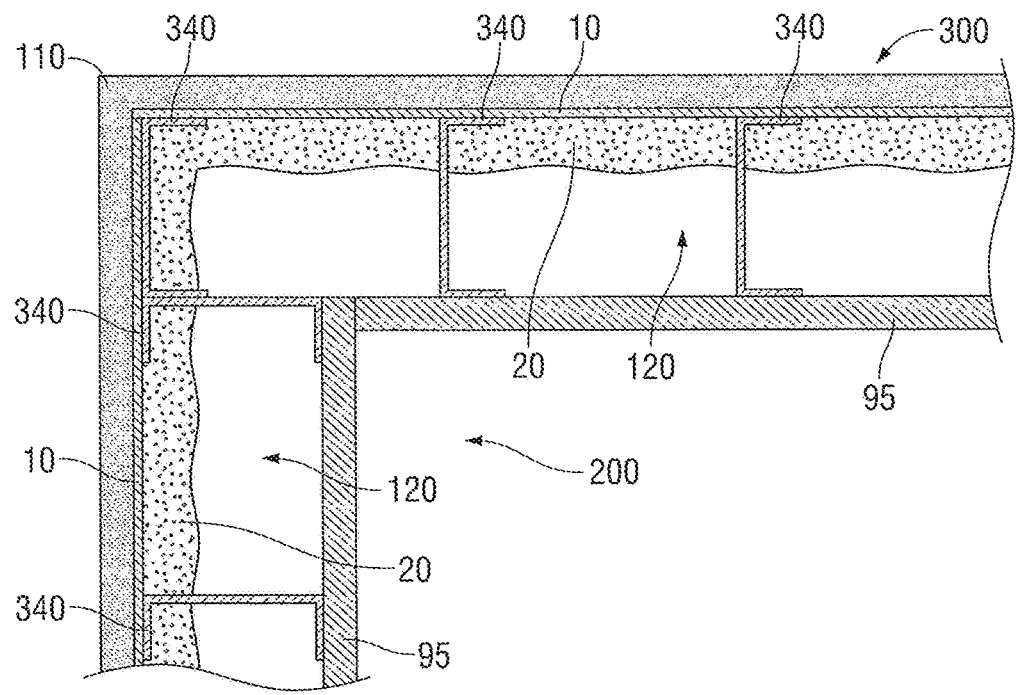
FIG. 7C is a top view cross-section of one embodiment of the frame and backing as joined to another embodiment of the frame and backing.

FIG. 7C is a top view cross-section of one embodiment of the frame and backing as joined to another embodiment of the frame and backing. As shown, two partitions 340 contact each other. Also shown is interior air cavity 120 formed between solid backing 95 and polyurethane or structural foam 20. Further illustrated is vapor barrier 110 as applied to the exterior solid backing 10. As shown, the two partitions 340 may be C channels.

Figure 8:
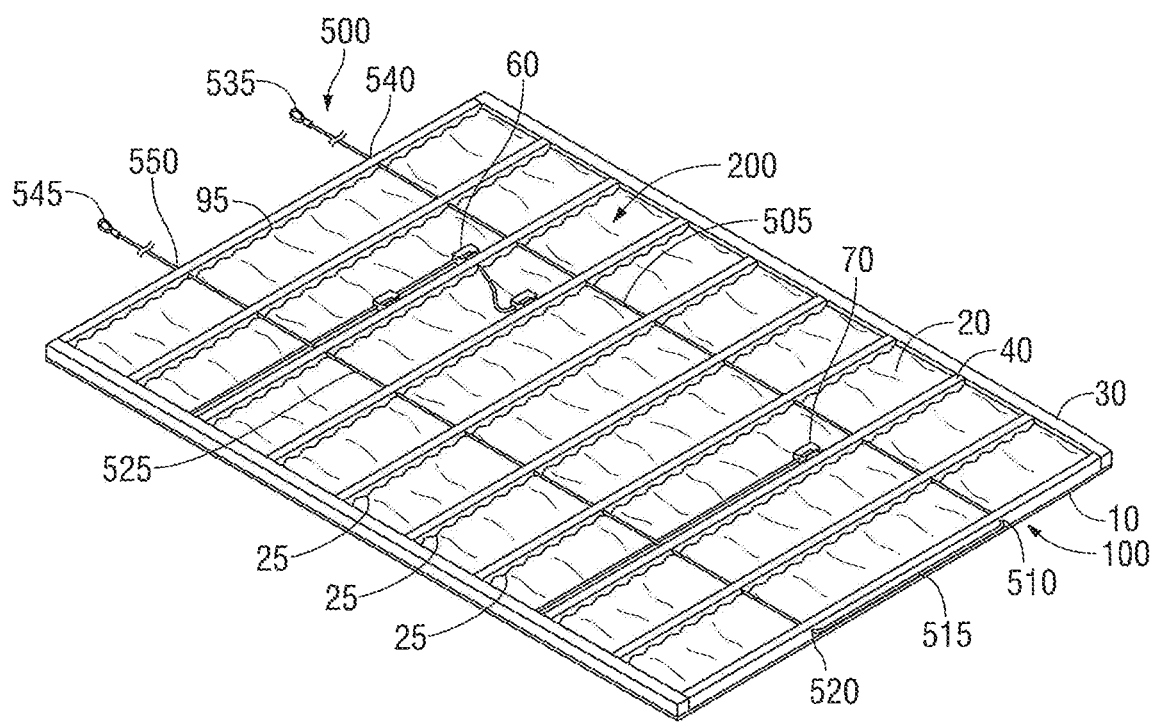
FIG. 8 is an angled top view of one embodiment of the frame and backing of the present invention with all cells of the frame and backing with electrical equipment attached as well as horizontal cabling.

FIG. 8 is an angled top view of one embodiment of the frame and backing of the present invention with all cells of the frame and backing with electrical equipment attached as well as horizontal cabling. In several embodiments, electrical equipment 60, 70 and wiring 50 (see FIG. 1) can be attached to the frame structure 30 or the partition beams 40. In many embodiments of the present invention, the electrical equipment 60, 70, and wiring 50 (see FIG. 1) are not in physical contact with the polyurethane or structural foam 20. In several embodiments, cable 500 has no physical contact with the polyurethane or structural foam 20. In some embodiments, it is envisioned that there can be some contact with foam 20 and cable 500. In several embodiments, interior solid backing 95 has a solid backing 95 which can be comprised of wood, metal, composite material or other construction materials utilized for the construction of a wall face. In several embodiments, solid backing 95 may be constructed of moisture resistant materials. In several embodiments, solid backing 95 may be constructed of heat resistant and/or flame-retardant materials. In several embodiments, solid backing 95 may be constructed of enhanced materials with increased tensile and modular strength. In some embodiments, solid backing 95 may be a lightweight cement tile backerboard. In some embodiments, solid backing 95 is water durable and composed of a mold-resistant substrate. In some embodiments, solid backing 95 is non-combustible. In some embodiments, solid backing 95 mitigates blasts and explosions.

Cable 500 may be composed of a material capable of tensioning and/or lifting a wall section 100 weighing at least 75 lbs. In several embodiments, cable 500 is equipped with eyelets, or other attachments surfaces 535 and 545 at the ends of cable 500 capable of being pulled to tension or support cable 500 as it loops through the interior of wall section 100. As shown, cable 500 can substantially enter the wall section 100 through ports 540 and 550.

In some embodiments, cable 500 can loop through partition beams 40 and exit/reenter the wall section 100. In many embodiments, cable 500 will traverse the entirety of wall section 100 in order to provide maximum support for wall section 100 when cable 500 is pulled to tension. In many embodiments, cable 500 can enter and exit wall section 100 in various locations on frame structure 30. In several embodiments, cable 500 is of sufficient strength to allow for either tensioning of wall section 100 with another section or lifting wall unit 100 off of the ground as done in construction work. In many embodiments, cable 500 can be used and interface with the wall section 100, frame structure 30 or partition beams 40 at the top, bottom, or sides of the respective wall section 100, frame structure 30 or partition beams 40. In some embodiments, the cable 500 is used to initially handle components in manufacturing, loading and unloading, and final assembly tying components together for greater wind and or seismic loading.

As shown, in some embodiments cable 500 runs through the wall section 100 in two parallel lines 505 and 525. As shown, cable 500 exits the wall section 100 at points 510 and 520, loops around the area of the wall section 100, distal to the eyelets 535 and 545. In some embodiments (not shown), the cable can pass through the partition beams 40 instead of the exterior of wall section 100. In several embodiments, eyelets 535 and 545 may be comprised from the cable 500 using crimping, shackling, stitching or welding.

Figure 9:
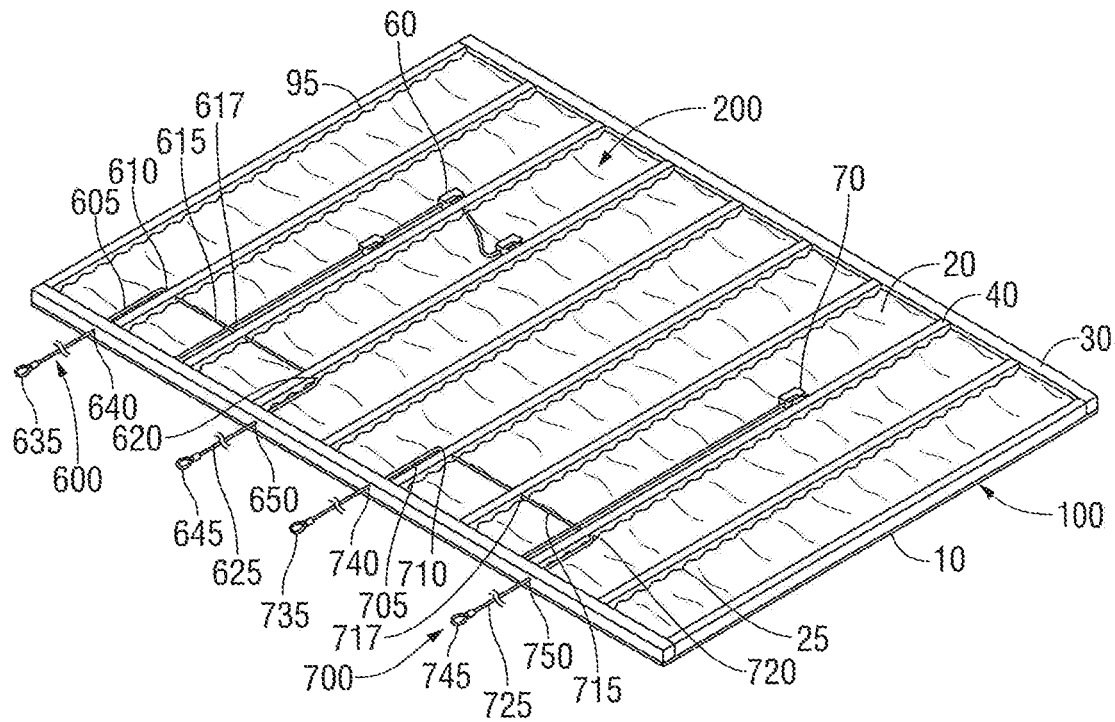
FIG. 9 is an angled top view of one embodiment of the frame and backing of the present invention with all cells of the frame and backing with electrical equipment attached as well as vertical cabling.

FIG. 9 is an angled top view of one embodiment of the frame and backing of the present invention with all cells of the frame and backing with electrical equipment attached as well as vertical cabling. In several embodiments, electrical equipment 60, 70 and wiring 50 (see FIG. 1) can be attached to the frame structure 30 or the partition beams 40. In many embodiments of the present invention, the electrical equipment 60, 70, and wiring 50 (see FIG. 1) are not in physical contact with the polyurethane or structural foam 20.

Also shown is cable 600. Cable 600 may be composed of a material capable of tensioning and/or lifting a wall section 100. In several embodiments, cable 600 is equipped with eyelets, or other attachments surfaces 635 and 645 at the ends of cable 600 capable of being pulled to tension or support cable 600 as it loops through the interior of wall section 100. As shown, cable 600 can substantially enter the wall section 100 through ports 640 and 650. In some embodiments, cable 600 can loop through partition beams 40 at port 617 and exit the wall section 100. In many embodiments, cable 600 will traverse a portion of wall section 100 in order to provide maximum support for wall section 100 when cable 600 is pulled to tension.

As shown, cable 600 in some embodiments can enter wall section 100 through ports 640, then follow the path 605 through stud hole/port 610, then pathway 615 through stud hole/port 617, then through stud hole/port 620, and finally out of the wall section 100 through port 650. In many embodiments, cable 600 can be used and interface with the wall section 100, frame structure 30 or partition beams 40 at the top, bottom, or sides of the respective wall section 100, frame structure 30 or partition beams 40. In several embodiments, protection of the cabling through the stud holes/ports 610, 617, and/or 620 is protected by using steel plastic or rubber grommets to protect from fraying, and or cutting of cable 600. In some embodiments, the cable 600 is used to initially handle components in manufacturing, loading and unloading, and final assembly tying components together for greater wind and or seismic loading.

Also shown is cable 700. Cable 700 may be composed of a material capable of tensioning and/or lifting a wall section 100. In several embodiments, cable 700 is equipped with eyelets, or other attachments surfaces 735 and 745 at the ends of cable 700 capable of being pulled to tension or support cable 700 as it loops through the interior of wall section 100. As shown, cable 700 can substantially enter the wall section 100 through ports 740 and 750. In some embodiments, cable 700 can loop through partition beams 40 at port 717 and exit the wall section 100. In many embodiments, cable 700 will traverse a portion of wall section 100 in order to provide maximum support for wall section 100 when cable 700 is pulled to tension. In many embodiments, cable 700 can be used and interface with the wall section 100, frame structure 30 or partition beams 40 at the top, bottom, or sides of the respective wall section 100, frame structure 30 or partition beams 40. In some embodiments, the cable 700 is used to initially handle components in manufacturing, loading and unloading, and final assembly tying components together for greater wind and/or seismic loading.

As shown, cable 700 in some embodiments can enter wall section 100 through ports 740, then follow the path 705 through stud hole/port 710, then pathway 715 through stud hole/port 717, then through stud hole/port 720, and finally out of the wall section 100 through port 750. In several embodiments, protection of the cabling through the stud holes/ports 710, 715, 717, and/or 720 is protected by using steel plastic or rubber grommets to protect from fraying, and or cutting of cable 700.

Figure 10:
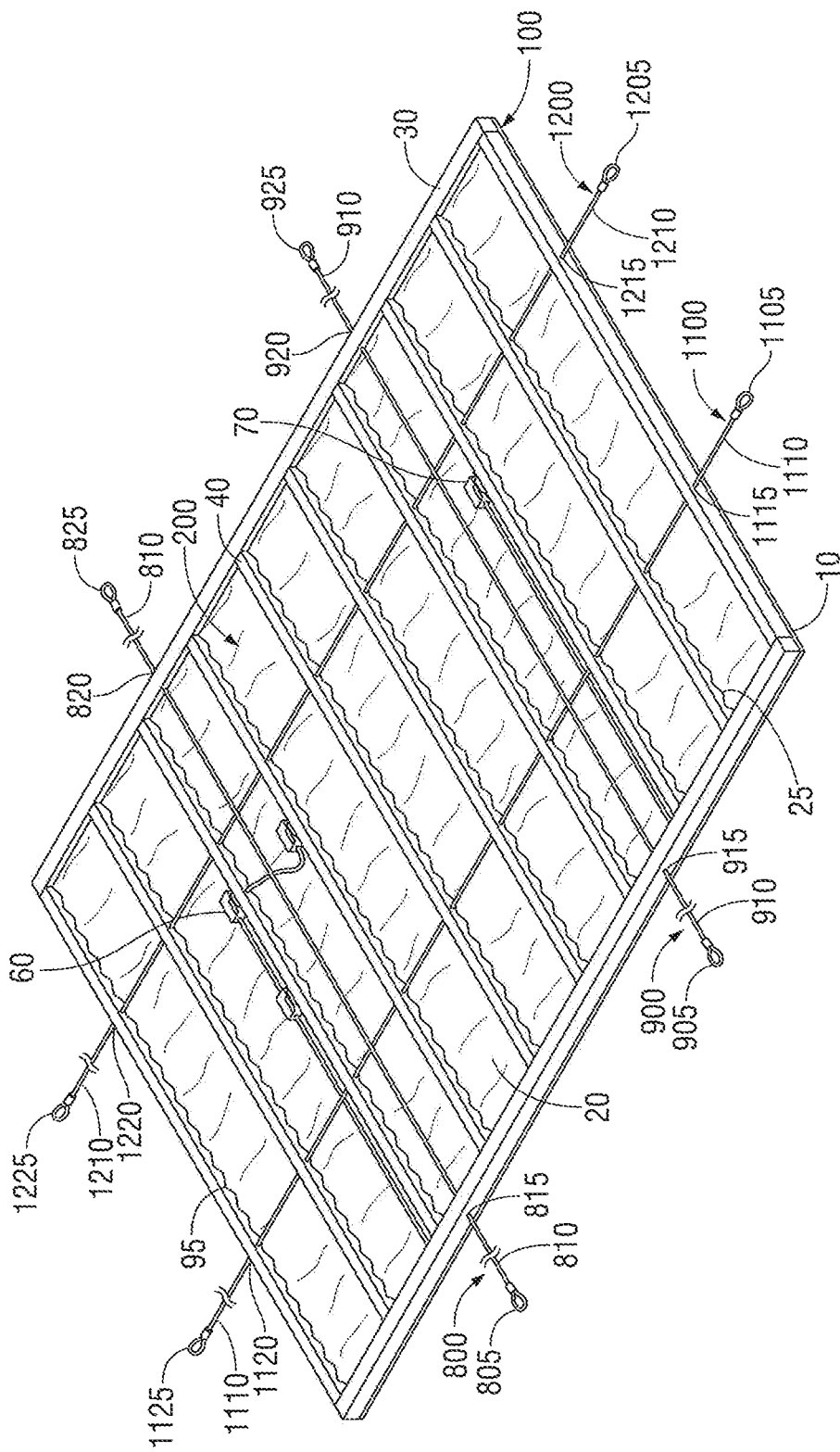
FIG. 10 is an angled top view of one embodiment of the frame and backing of the present invention with all cells of the frame and backing with electrical equipment attached as well as horizontal and vertical cabling.

FIG. 10 is an angled top view of one embodiment of the frame and backing of the present invention with all cells of the frame and backing with electrical equipment attached as well as horizontal and vertical cabling. In several embodiments, electrical equipment 60, 70 and wiring 50 (see FIG. 1) can be attached to the frame structure 30 or the partition beams 40. In many embodiments of the present invention, the electrical equipment 60, 70, and wiring 50 (see FIG. 1) are not in physical contact with the polyurethane or structural foam 20.

FIG. 10 illustrates an alternate embodiment of the present invention in which at least four support cables are used. As shown, cable, or cable set 800 is preferably constructed with an eyelet 805 or attachment mechanism located at one end, and eyelet 825 located at the end distal for eyelet 805. As shown, cable 810 can enter wall section 100 through orifice 815, traverse the interior of wall section 100, and exit from outlet 820. In many embodiments, cable 800 can be used and interface with the wall section 100, frame structure 30 or partition beams 40 at the top, bottom, or sides of the respective wall section 100, frame structure 30 or partition beams 40. In some embodiments, the cable 800 is used to initially handle components in manufacturing, loading and unloading, and final assembly tying components together for greater wind and or seismic loading. In several embodiments, the cable 800 allows for greater safety during manufacturing, loading and unloading of individual wall panels or wall sections 100.

FIG. 10 illustrates an alternate embodiment of the present invention in which at least four support cables are used. As shown, cable, or cable set 900 is preferably constructed with an eyelet 905 or attachment mechanism located at one end, and eyelet 925 located at the end distal for eyelet 905. As shown, cable 910 can enter wall section 100 through orifice 915, traverse the interior of wall section 100, and exit from outlet 920. In many embodiments, cable 900 can be used and interface with the wall section 100, frame structure 30 or partition beams 40 at the top, bottom, or sides of the respective wall section 100, frame structure 30 or partition beams 40. In some embodiments, the cable 900 is used to initially handle components in manufacturing, loading and unloading, and final assembly tying components together for greater wind and or seismic loading. In several embodiments, the cable set 900 allows for greater safety during manufacturing, loading and unloading of individual wall panels or sections 100.

FIG. 10 illustrates an alternate embodiment of the present invention in which at least four support cables are used. As shown, cable, or cable set 1100 is preferably constructed with an eyelet 1105 or attachment mechanism located at one end and eyelet 1125 located at the end distal for eyelet 1105. As shown, cable 1110 can enter wall section 100 through orifice 1115, traverse the interior of wall section 100, and exit from outlet 1120. As shown, cable 1110 can penetrate and traverse partition beams 40 at various intervals. In many embodiments, cable 1100 can be used and interface with the wall section 100, frame structure 30 or partition beams 40 at the top, bottom, or sides of the respective wall section 100, frame structure 30 or partition beams 40. In some embodiments, the cable 1100 is used to initially handle components in manufacturing, loading and unloading, and final assembly tying components together for greater wind and or seismic loading. In several embodiments, the cable set 1100 allows for greater safety during manufacturing, loading and unloading of individual wall panels or sections 100.

FIG. 10 illustrates an alternate embodiment of the present invention in which at least four support cables are used. As shown, cable, or cable set 1200 is preferably constructed with an eyelet 1205 or attachment mechanism located at one end, and eyelet 1225 located at the end distal for eyelet 1205. As shown, cable 1210 can enter wall section 100 through orifice 1215, traverse the interior of wall section 100 and exit from outlet 1220. As shown, cable 1210 can penetrate and traverse partition beams 40 at various intervals. In many embodiments, cable 1200 can be used and interface with the wall section 100, frame structure 30 or partition beams 40 at the top, bottom, or sides of the respective wall section 100, frame structure 30 or partition beams 40. In some embodiments, the cable 1200 is used to initially handle components in manufacturing, loading and unloading, and final assembly tying components together for greater wind and or seismic loading. In several embodiments, the cable set 1200 allows for greater safety during manufacturing, loading and unloading of individual wall panels or sections 100.

Figure 11:
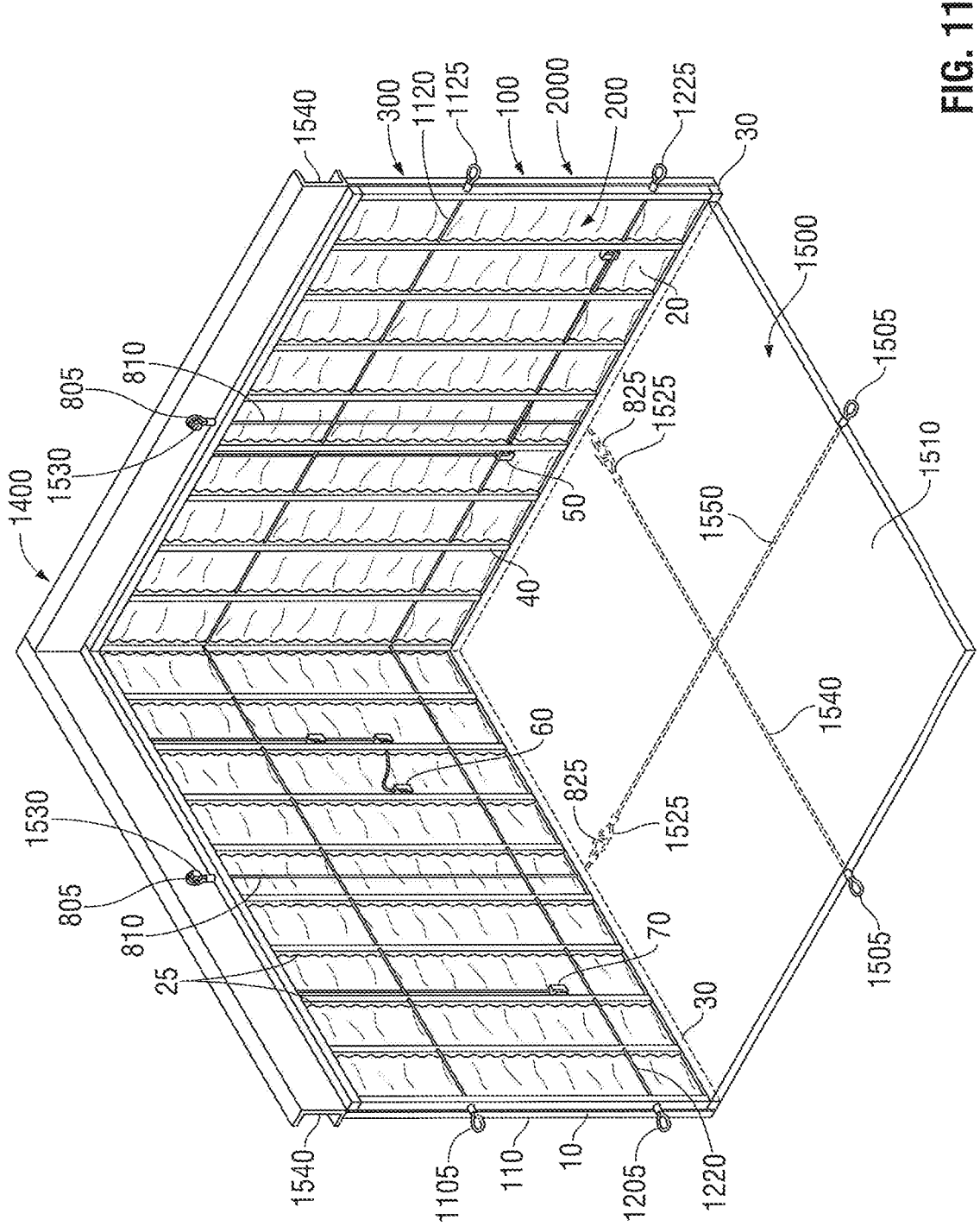
FIG. 11 a partially angled view of one embodiment of the present invention as assembled as a wall juncture with tethering to a floor.

FIG. 11 is a partially angled view of one embodiment of the present invention as assembled as a wall juncture with tethering to a floor. As shown, in some embodiments, wall section 100 is attached to flooring unit 1500. Flooring unit 1500 can be another wall unit 100 scaled for use as a floor, or, as shown, a concrete slab 1510. As shown, concrete slab 1510 has cabling 1540 and 1550 traversing the interior of concrete slab 1510. As shown, cabling 1540 and 1550 have eyelets 1505 and 1525. In several embodiments, concrete slab 1510 does not need cabling 1540 or 1550 to traverse the entire concrete slab 1510. In several embodiments, the eyelets 1505 and 1525 may be comprised from the cable 1540 and 1550 using crimping, shackling, stitching or welding.

As further shown, cables 810 traverse wall units 100 vertically. As shown, in this embodiment, eyelets 825 can be secured to eyelets 1525 as are known in the art for cinching. Further illustrated are trusses 1530 used to secure cables 810 via eyelets 805 when the invention is cinched or tightened. As further shown, trusses 1530 are secured to C clamps 1540 for added stability.

Further illustrated are cables 1220 and 1120 which can traverse wall unit 100 horizontally. In many embodiments, cables 1220 and 1120 can be mechanically engaged with multiple corresponding cables 1220 and 1120 through the locking of eyelets 1105 with eyelets 1125 and eyelets 1205 with eyelets 1225 respectively.

In several embodiments of the present invention, when all cables 1540, 1550, 1220, 1120, and 810 are tightened, the entire structure is tightened and cinched, therein allowing for increased load capacity and seismic tolerances for the entirety of the construct 2000.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied.

We claim:

1. A building panel comprising:
a structural foam for floors, walls, ceiling and roof assemblies;
a frame structure with an interior portion; wherein said frame structure is partially filled, in an open cavity pour, with said structural foam, to allow for utility equipment to be installed without interfacing with said structural foam:
said structural foam adheres to said frame structure, said structural foam does not need trimming; wherein said structural foam creates a monolithic structure with said frame structure with an increase in tensile strength, wind loading strength, racking strength, sheer strength, and/or compressive strength, thermal properties, and combinations therein,
at least one cable set with first eyelets located partially outside of said frame structure and traversing at least a partial interior portion of said frame structure above said structural foam; wherein said at least one cable set with first eyelets is used to hoist said building panel and to attach said building panel to other building materials;
electrical equipment and wiring attached to said frame structure;
wherein said at least one cable set is not in contact with said structural foam; and wherein
said electrical equipment and wiring are not in contact with said structural foam.

2. The building panel of claim 1 further comprising;
said structural foam achieves ballistic and blast mitigation by incorporating nanobead
ballistic materials into said structural foam.

3. The building panel of claim 1 further comprising;
said frame structure is comprised of structural steel, wood, fiberglass, aluminum,
polyurethane, or composite materials.

4. The building panel of claim 1 further comprising;
said structural foam is moisture resistant.

5. The building panel of claim 1 further comprising;
the structural foam is a polyurethane foam.

6. The building panel of claim 1 further comprising;
said at least one cable set is comprised of multiple cable sets.

7. The building panel of claim 1 further comprising;
said at least one cable set fully traverses said interior portion of said frame structure.

8. A building component utilizing a structural foam that can be used for floors, walls, ceiling, and roof assemblies, wherein said building component is partially filled, in an open cavity pour, with said structural foam to allow for electrical equipment to be installed without interfacing with said structural foam comprising:
a frame with a frame interior, frame back, and a frame front;
multiple partition beams forming cells in said frame;
exterior backing attached to said frame back; and
interior backing; and
at least one cable set with first eyelets located partially outside of said frame and traversing at least a portion of said frame interior above said structural foam; wherein said at least one cable set with first eyelets is used to hoist said building component and to attach said building component to other building materials; wherein said structural foam is poured into said cells to a level to avoid trimming said foam, and after said structural foam is poured into said cells, said interior backing is attached to said frame front;

said electrical equipment and wiring attached to said frame; wherein said at least one cable set with first eyelets is not in contact with said structural foam; and wherein said electrical equipment and wiring are not in contact with said structural foam.

9. The building component of claim 8 further comprising;
said structural foam achieves ballistic and blast mitigation by incorporating nanobead ballistic materials into said structural foam.

10. The building component of claim 8 further comprising;
said frame is comprised of structural steel, wood, fiberglass, aluminum, polyurethane, or composite materials.

11. The building component of claim 8 further comprising;
said structural foam is a polyurethane foam.

12. The building component of claim 8 further comprising;
said at least one cable set with eyelets is comprised of multiple cable sets.

13. A building panel component utilizing a structural foam that can be used for floors, walls, ceiling and roof assemblies, wherein said building panel component is partially filled, in an open cavity pour, with said structural foam to allow for utility equipment to be installed without interfacing with said structural foam comprising:

a structural frame with a frame interior, frame back, and a frame front;

multiple partition beams forming first cells in said interior of said structural frame;

said structural foam;

an exterior backing attached to said frame back; and an interior backing;

at least one first cable set with eyelets located partially outside of said structural frame and traversing at least an interior portion of said structural frame above said structural foam; wherein said first cable set with eyelets is used to hoist said building panel component and to attach said building panel component to other building materials;

at least one second cable set with eyelets located partially outside of said structural frame and traversing at least an interior portion of said structural frame above said structural foam; wherein said second cable set with eyelets is used to hoist said building panel component and to attach said building panel component to other building materials; wherein said first cable set with eyelets and said second cable set with eyelets intersect each other in said frame interior of said structural frame; wherein said structural foam is poured into said first cells to a level to prevent the need to trim said structural foam, and after said structural foam is poured into said cells, said interior backing is attached to said frame front;

electrical equipment and wiring attached to said structural frame; wherein said at least one first cable set with eyelets is not in contact with said structural foam;

said at least one second cable set with eyelets is not in contact with said structural foam; and wherein said electrical equipment and wiring are not in contact with said structural foam.

14. The building panel component of claim 13 further comprising;
a plurality of said building components in attachment with each other via said at least one first cable set with eyelets and at least one second cable set with eyelets.

* * * * *